May 7, 1929.  W. C. SCHOPPNER  1,711,750
DUPLEX DEPOSITOR
Filed Oct. 23, 1924  6 Sheets-Sheet 1

INVENTOR
William Christopher Schoppner
BY
ATTORNEYS

May 7, 1929.  W. C. SCHOPPNER  1,711,750
DUPLEX DEPOSITOR
Filed Oct. 23, 1924   6 Sheets-Sheet 2

Fig. 2.

INVENTOR
William Christophe Schoppner
BY Chapin & Neal
ATTORNEYS

May 7, 1929.                W. C. SCHOPPNER                1,711,750
                              DUPLEX DEPOSITOR
                           Filed Oct. 23, 1924         6 Sheets-Sheet 6

INVENTOR
William Christophe Schoppner
BY Chapin Neal
ATTORNEYS

Patented May 7, 1929.

1,711,750

UNITED STATES PATENT OFFICE.

WILLIAM CHRISTOPHER SCHOPPNER, OF ASTORIA, NEW YORK.

DUPLEX DEPOSITOR.

Application filed October 23, 1924. Serial No. 745,505.

This improvement is a new type of depositing machine particularly adapted to make chocolate covered confections. I am aware that depositing machines are broadly old and that nozzles intended to procure the deposition of one material partly enclosed by another are illustrated in the prior art.

My invention is in the apparatus for effecting an improved mode of operation in depositing machines whereby two materials may be deposited, one enclosed by the other, with the same certainty of result (except as to the constituents of the product) as one material has heretofore been deposited. My invention will also be found in many of the combinations in the machine by which the art of depositing confections is improved. The objects of the invention will appear clearer as the description proceeds.

I have illustrated a machine for depositing chocolate creams, for example on a conveyer with the parts automatically operable. The ordinary way to make chocolate creams by machinery is to mold the centers in starch and then coat the centers with chocolate on a coating machine. If it is desired to use a cream center which is too thin to mold or to use a fruit juice center or a material which is not stable enough to stand up in the molding and coating steps, resort is ordinarily had to the operations of molding the chocolate covering first and afterwards filling it with the desired center and finally covering the filling with chocolate. But these operations, carried on at different times, are expensive, do not lend themselves readily to machine operations, and have been carried on for the most part by hand operators in making the most expensive kinds of candy, chiefly expensive because of the labor involved.

My improvement is designed to make chocolate covered candies by one depositing operation and substantially independent of the character of the center material which is coated. I can thus coat centers which are so thin that they would not stand up for molding operations prior to coating and I avoid the cost of molding the covering material prior to the filling operations. I accomplish this by a positive control of the measuring and depositing operations in predetermined proper relation to one another never before attained in this art so far as I am aware.

The means by which this is accomplished is illustrated sufficiently in the accompanying drawings for anyone skilled in the art to embody the invention in various specific machines according to the individual designer's wish.

Fig. 2 is a partial sectional elevational view taken on the line 2—2 of Fig. 1;

Figure 1:
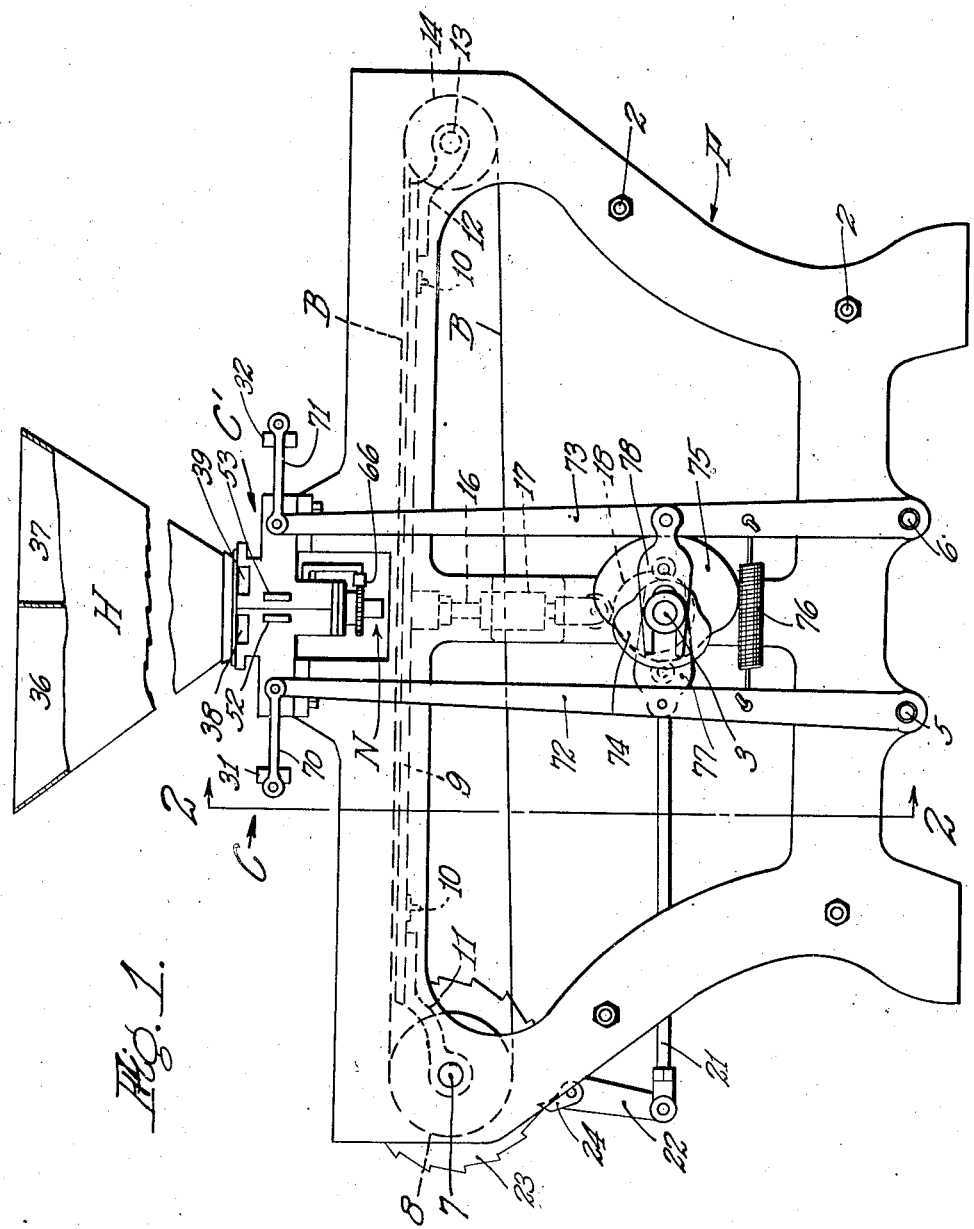
Fig. 1 is a side elevational view of a machine embodying my invention.

Figs. 6 to 10 inclusive are views showing the successive steps and operation of one of the depositing nozzles; and Fig. 11 is a perspective fragmentary view of the cut-off bar assembly.

In order to facilitate a clear understanding of the details of construction of the apparatus comprising my invention, I will first describe the apparatus in a general way. A traveling belt B is provided that receives measured quantities of material deposited thereon by depositing mechanisms C and C' located above the belt, while a hopper H supported by the depositors is adapted to supply the depositors with material.

The apparatus is preferably supported by side frames F that are held in a spaced relation by tie bolts 2 to form a rigid supporting structure. A main drive shaft 3 is journalled in the frames F and may be driven in any suitable manner, as by a pulley 4 fixed thereto, see Fig. 2. Rock shafts 5 and 6, parallel to the shaft 3, are mounted in the frames F and are adapted for an oscillatory movement for the purpose as will later be described.

A driven shaft 7, rotatably carried in the frames, has fixed thereto a drum 8 for supporting and driving the belt B. A belt supporting frame comprised of the longitudinal bars 9 and the cross bars is supported from the shaft 7 by hangers 11 pivoted thereon and preferably located at either end of the roll 8. Other hangers 12, secured to the opposite end of the belt support, carry a rotatable shaft 13 on which is fixed an idler belt drum 14. The belt B, which is of a flexible or pliable construction, is served over the drums 8 and 14, as shown, and is supported intermediate the said drums by the support previously referred to, which support is arranged to be capable of a rise and fall by reason of its pivotal connections with the shaft 7.

Mechanism for actuating the belt support in its rising and falling movement will now be described. A central cross beam 15 fixed to the bars 9 is provided with depending rods 16 at the ends thereof that are slidable in vertical guide bearings 17 carried by the frames, while rolls 18 rotatable in the lower ends of the rods 16 rest upon cams 19 fixed to the driving shaft 3. The cams 19 are preferably designed and arranged to retain the support and belt B in its elevated position during the depositing of the measured quantities of material thereon and to effect the subsequent lowering of the belt in a proper timed relation just at the end of the depositing mechanism's movement with respect to the other parts of the apparatus.

If it is desirable to operate the belt B by a step-by-step movement as is common in depositors, I provide, to accomplish this, actuating means comprising a crank 20 fixed to the end of shaft 3 that is connected by a rod 21 to an oscillating lever 22 rotatably mounted on the shaft 7, while a sprocket 23, fixed to the shaft 7, is actuated in the well known manner by a spring pressed pawl 24 carried by the lever 22. The teeth of the ratchet and throw of the lever 22 may be varied within wide limits to move the belt B in steps as may be desired, the mechanism shown being merely intended to illustrate to those skilled in the art that one may give the belt the desired movement in the working of my invention.

The mechanism for measuring and depositing the materials upon the belt will now be described.

Separate and independent material measuring mechanisms indicated as C and C' are provided that are arranged to deliver measured quantities of material to a plurality of depositor nozzles N. The mechanisms are capable of broad application wherever it is desired to measure and deposit materials in a semi-fluid condition but will be described herein in connection with the candy art wherein it is desired to measure and deposit a predetermined quantity of coating material such as chocolate that encloses or envelops a measured quantity of filling material such as a center having characteristics different than the coating, and for the purposes of description it will be assumed that the portion of the mechanism indicated at C is intended to measure the aforesaid chocolate coating material while that indicated at C' will measure the filling material, such as cream center material.

Figure 3:
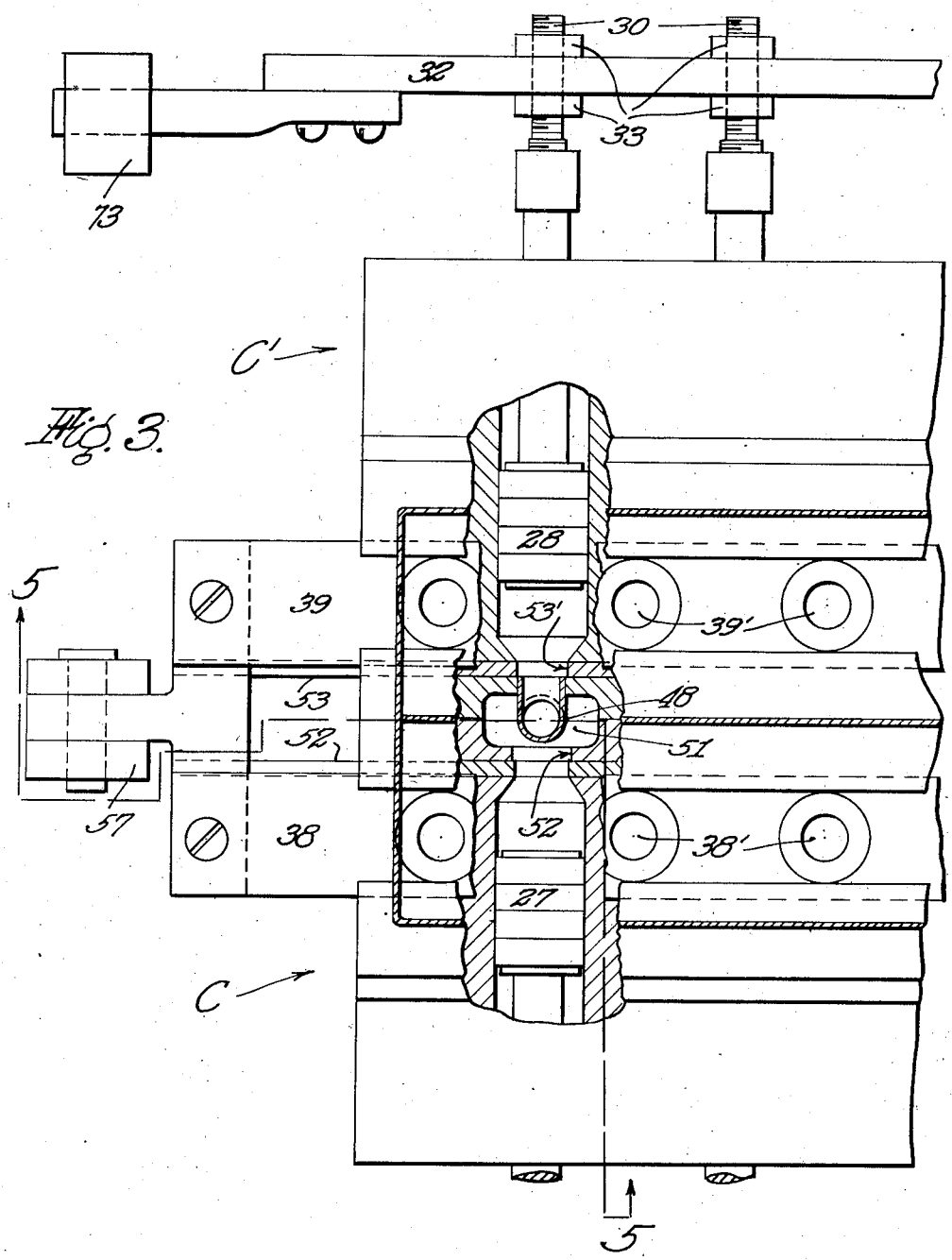
Fig. 3 is an enlarged sectional plan view taken on the line 3—3 of Fig. 2 with certain of the parts in section to show relative positions of the cut-off bars and material measuring plungers.
Figure 4:
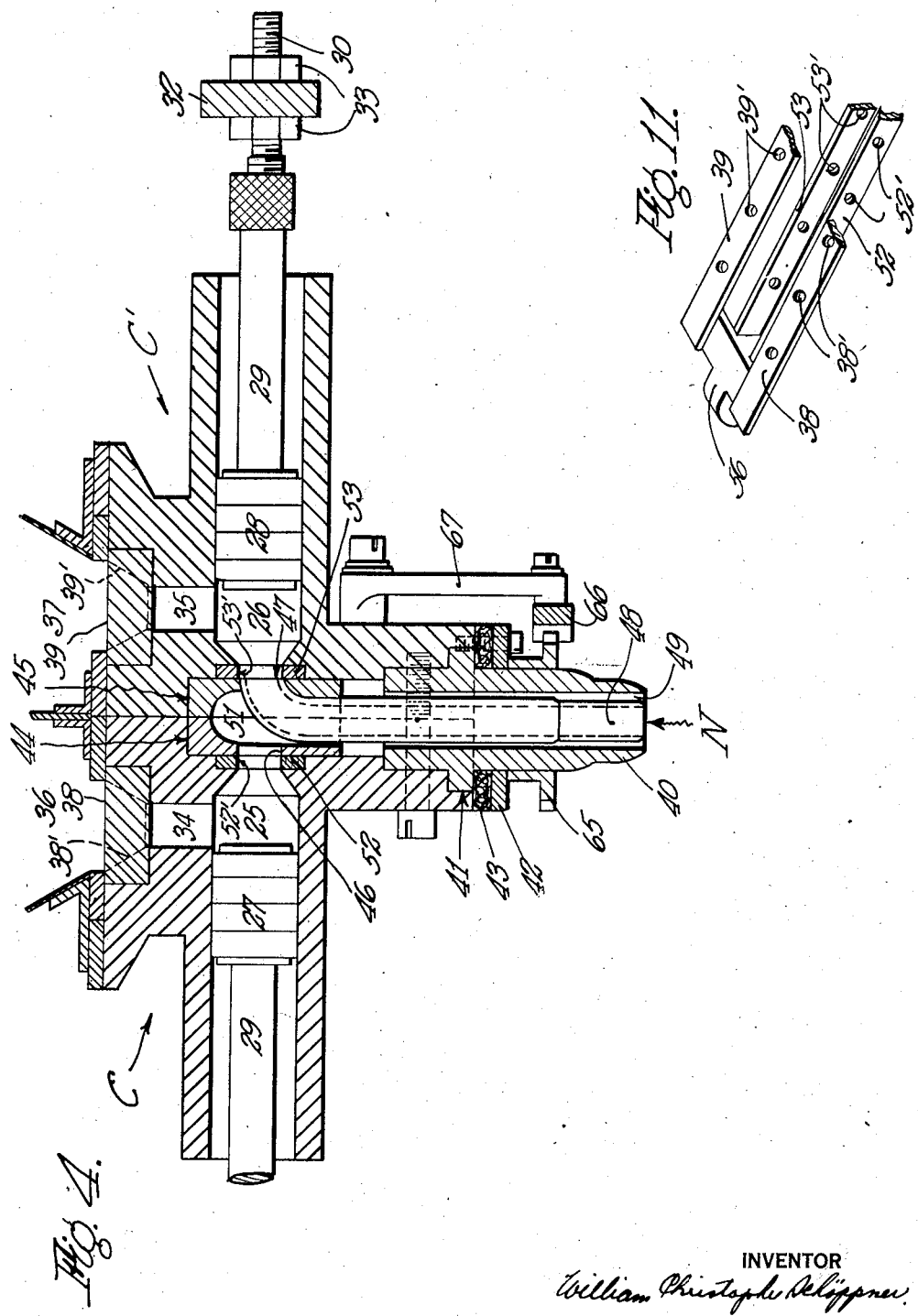
Fig. 4 is an enlarged sectional elevational view taken on the line 4—4 of Fig. 2.
Figure 5:
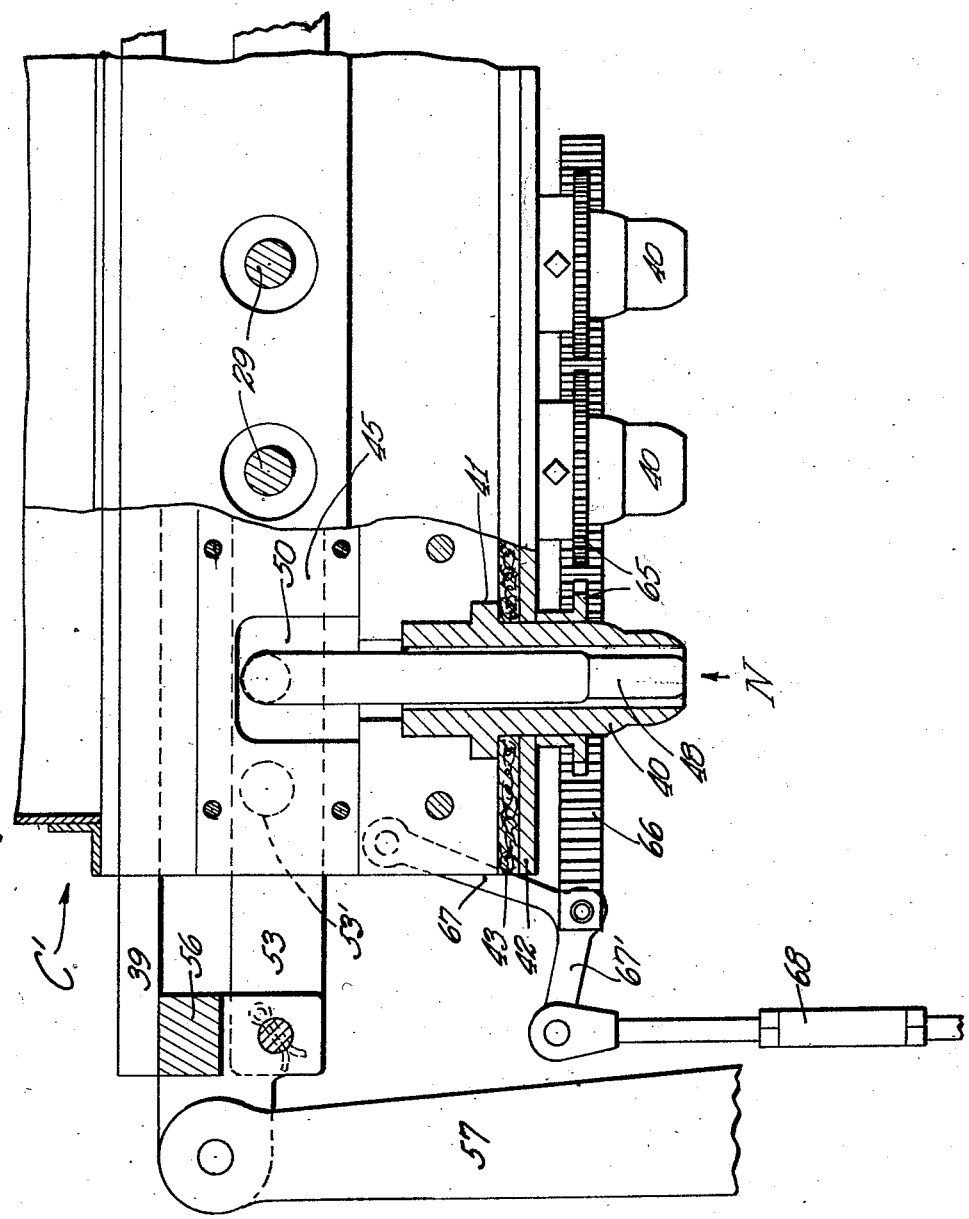
Fig. 5 is a sectional elevational view taken on the line 5—5 of Fig. 3.

The members C and C' are each provided with aligned horizontal material measuring cylinders 25 and 26, as best shown in Figs. 3, 4 and 5. Piston plungers 27 and 28 are reciprocable within the cylinders and are provided with rods 29 having screw threaded ends 30 adjustably fixed in pump bars 31 and 32 by means of the adjusting nuts 33. Any number of measuring cylinders desired may be provided, but as shown, the cylinders are preferably arranged in pairs and in horizontal alignment, each pair being associated with a nozzle structure N for depositing material onto the belt. The series of nozzles N extend below the depositor mechanism in a transverse line above the belt B.

Upwardly extending passageways 34 and 35 in the members C and C' connect their respective cylinders 25 and 26 with separate compartments 36 and 37 of the feed hopper H. Cut off bars 38 and 39 slidable over the passageways 34 and 35 are provided with openings 38' and 39' which are arranged to register with the passageways 34 and 35 and to control the connection of the compartments and cylinders as will presently appear.

Hollow nozzles 40 are provided that are rotatably carried in suitable sockets of the members C and C' as best shown in Fig. 4. A flange 41 carried by each nozzle is suitably fitted in a counter base of the members and a retaining plate 42 and wearing strip 43 encircle the nozzles to hold them in their respective sockets and allow a turning action thereof.

A plate 44 is removably fixed in a suitable channel recess of the member C and is provided with discharge openings or ports 46 that align with the measuring cylinders 25. A similar plate 45 is likewise fixed to the member C'; which is also provided with discharge openings or ports 47 which are in alignment with the measuring cylinders 26. An inner nozzle 48 for depositing the filling material and in the form of a tube is provided that extends upwardly through the nozzle 40 and is preferably curved at its upper end and fixed in the opening 47 of the plate 45. The tube 48 is preferably smaller in diameter than the interior of the nozzle 40 to provide an annular passageway 49 therebetween to allow coating material to flow therethrough. The relative sizes of the tube 48 and nozzle 40 may, of course, be varied to provide a passageway 49 of such size as may be desired. Recesses 50 are provided in the plates to form a chamber 51 whereby the flow of material from the cylinder 25 and into the passageway 49 is not obstructed by the tube 48.

Cut off bars 52 and 53 similar to those indicated at 38 and 39 are provided which are reciprocable in the members C and C' and are provided with openings 52' and 53', arranged to register with the cylinders 25 and 26 and ports 46 and 47 whereby the cylinders and nozzles are in communication at predetermined times during the operation of the apparatus.

The cut off bars 38, 39, 52 and 53 are connected to a cross head 56 by the means of which they are moved simultaneously. As will be seen by reference to Fig. 11, the openings 52' and 53' of the bars 52 and 53 are staggered with respect to the openings 38' and 39' of the bars 38 and 39. From this it will be observed, by reference to Figs. 3 and 5, that as the bars are moved in and out the openings thereof are brought into registering positions with the ports 34 and 35, and 46 and 47 alternately with respect to all the nozzles and their ports. The openings are so arranged in a staggered relation as aforesaid so that the openings 46 and 47 are uncovered while those indicated at 34 and 35 are closed. The apparatus is so operated and timed that the ports 34 and 35 are in communication with their respective hoppers during the outward or suction stroke of the pistons. During the inward or pressure stroke of the pistons, the ports 34 and 35 are closed by the cut off bar, while the ports 46 and 47 are open.

The cross head 56 is reciprocated to alternately open and close the ports as aforesaid by means of an oscillating lever 57 pivoted to the frame at 58 and actuated by a cam 61 with cam slot 60 fixed to the shaft 3.

As previously stated, the nozzles 40 are adapted for a rotative movement and to facilitate their rotation each has fixed thereto spur gears 65 that are in meshing engagement with a reciprocating rack 66. The rack 66 is pivotally connected adjacent its ends by means of the links 67 to the member C' and is arranged to swing in a sideways direction to affect a rotative movement of the nozzles.

It is desired that the nozzles be rotated at such times as the belt B is being lowered for the purpose as will later appear and to accomplish this I provide a pull rod 68 connected to the arm 67' of the link 67 as shown in Fig. 2 that is moved up and down by an extension arm 69 fixed to the belt support as shown in Fig. 2. Any other mechanism may be employed but that shown is adapted to actuate the nozzles in the manner at present desired.

The pistons 27 and 28 are moved in their suction stroke and outwardly from their position shown in Fig. 4 and inwardly in their compression stroke by means of the following mechanism. Links 70 and 71 (see Fig. 1) are pivotally connected at either end of the pump bars 31 and 32 to levers 72 and 73 fixed on opposite ends of the rock shafts 5 and 6.

Edge cam 74 and 75 are fixed to the shaft 3 while cam forks 77 and 78 connected to the levers 72 and 73 are slidable upon the shaft and each has a roll that rides upon the face of the said cams respectively. A strong spring 76 connected between the levers 72 and 73 functions to positively hold the levers against the action of the cams. The grooved faced cam and roller type of cam may be used to positively move the levers 72 and 73 without the use of a spring which is shown for convenience.

It is desired, according to the preferred form of the invention, that the measuring mechanism C deposit a greater volume of coating material as compared with a less volume of filling material delivered by the measuring mechanism C' and to this end I provide a cam 74 having a longer throw than the cam 75 whereby the piston 27 is given a longer stroke than the piston 28. It is also desired that the piston 27 begin its inward or delivery stroke prior to the beginning of the stroke of the piston 28 and that the latter stroke be completed prior to the completion of the former. To accomplish this, I have provided cams that are so constructed and arranged as shown as to actuate the levers for moving their respective piston bars in the desired timed relation.

By modifying or changing the timing of the cams or by substituting other operating means, it will be obvious that it is possible to change the relative measured quantity of material to be delivered by the mechanisms C and C' and that the relative times of delivery may be changed at will.

In operation, the hopper compartment 36 is supplied with coating material, while the compartment 37 is supplied with a filling material. The driving shaft 3 is driven from a suitable source of power and the various units are thereby actuated in a proper timed relation and in the following manner. The cut off bars 52 and 53 are so timed with respect to the pistons 27 and 28 that communication is cut off between the nozzles and cylinders during the outward or suction stroke of said pistons, while during this period the cylinders are in direct communication with their respective hoppers. During this suction stroke, material is drawn into the cylinders 25 and 26, and, as previously explained, since the stroke of the pistons 27 is longer than that of 28, the cylinder 25 will contain a larger volume of coating material than will the cylinder 26 of filling material. As the pistons arrive at their extreme outward stroke, the cut off bars are operated to cut off communication between the cylinders and hopper compartments and to open the said cylinders to the nozzles.

Figure 6:
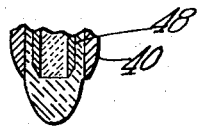

The mechanism for moving the pistons inwardly in their compression or delivery stroke, as previously explained, is adapted to move the piston 27 in advance of the piston 28, and as the piston 27 advances, the measured quantity of material within the cylinder is forced through the opening in the cut off bar 52 into the chamber 51 and downwardly through the passageway 49 as shown in Fig. 6.

Figure 7:

At a predetermined time, the piston 28 is actuated to force the filling material within the cylinder 26 downwardly through the inner nozzle 48, whereby, as will be seen in Fig. 7, the outer coating material and inner filling material are delivered simultaneously and deposited onto the belt B.

Figure 8:
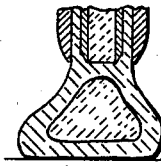

When the piston 28 reaches the end of its inward or compressed stroke it has delivered its measured quantity of material, but since the piston 27 is moved after the piston 28 has come to rest and also since it measures a larger volume by reason of its longer stroke, it continues to advance and to deliver the remainder of the coating material. The coating material enclosing the filling material is delivered or deposited onto the belt as shown in Fig. 8.

Figure 9:
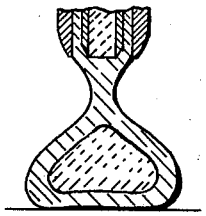
Figure 10:
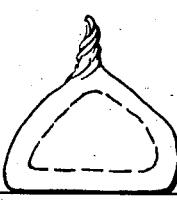

As the piston 27 comes to rest at the end of its stroke, or at about this time either slightly before or after, the belt B is lowered by means of the mechanism provided therefor. The coating material between the end of the nozzle and material deposited, is drawn out in the form of a pigtail, as indicated at Fig. 9. Simultaneously with the lowering of the belt the nozzles are rotated by means of the gears 65 and rack 66 which is operated by the lowering of the belt support as previously explained, and the rotation of the nozzles twists the pigtail detaching it from the nozzles and producing an ornamental effect at the top of the candy as shown in Fig. 10. Or the string may be drawn out so as to fall over on the deposited piece when the final break comes.

The belt B is subsequently returned to its upper receiving position which may be at any desired distance from the nozzles and advanced in a step-by-step movement and then receives other candies deposited thereon.

It is now clear from the above disclosure that I can use chocolate of any desired consistency suitable for coating and insert a center of any desired material which can be pumped. The fact that the materials are first measured and then forcibly deposited in proper timed relation and in proper relative position one within the other in a single depositing operation is one of the chief features of my invention.

The belt to receive the deposited pieces is illustrative only. I contemplate depositing the covered pieces in all sorts of final forms known in the art, chiefly accomplishel heretofore by hand. For example, I may deposit the two materials in a mold which will then shape the pieces on the outside in a desired way. I may deposit them in tin-foil cups or even paper cups such as are used to hold the confections until they are eaten.

From my disclosure, a candy maker may vary the specific use of the apparatus according to the kind of particular confections he desires in a great many ways all within the intended scope of my invention. I contemplate its use in manufacture of the simplest forms of coated candies as well as the most elaborate coated forms within the confectioner's art.

What I claim is:

1. A confectionery making machine including in combination, a vertically arranged nozzle element having two separate concentric outlets, two separate containers one for each of said outlets, and horizontally arranged power operated pump mechanism operable between said containers and outlets, said mechanism being arranged to cause the extrusion of material from one outlet in a measured timed relation differing from the extrusion of material from the other outlet, the outlets through said nozzle element being vertically and concentrically arranged substantially from the level of their communication with the pump mechanism to their exit openings.

2. A confectionery making machine including in combination, a vertically arranged nozzle element having two separate concentric outlets, two separate containers one for each of said outlets and having horizontally arranged measuring chambers between the containers and outlets, and power operated pump mechanism operable between said containers and outlets and in said measuring chambers, said mechanism being arranged to cause the extrusion of material from one outlet to begin before the extrusion of material from the other outlet and to end after the extrusion from said other outlet has ended, and cut-off bars for said measuring chambers operable to shut off communication with the nozzle outlets as each extrusion operation is finished.

3. A confectionery making machine including in combination a vertically arranged nozzle element having two separate concentric outlets, two separate containers for material to be fed through said outlets, connections from each outlet to one of said containers including a horizontally disposed measuring chamber and mechanism operable to measure and force material first through the outside outlet alone, then force material through the inner outlet at the same time with the material being forced through the outer outlet and finally force material through the latter outlet alone, and means to prevent any return feed of the extruded material to said measuring chamber during the operation of said measuring mechanism.

4. A chocolate coating machine including in combination, a container for the plastic chocolate, a separate container for the plastic or liquid material to be coated, a series of common outlet means each connected to said containers a series of horizontally arranged pumps one in each of the passages between the containers and their common outlet means, said outlet means each including one passage connected to the chocolate container and surrounding another passage connected to the other container whereby a die is formed at the common outlet to control the position of the materials extruded and means to operate said pumps in intermittent and timed relation whereby the chocolate is extruded first and last and the material to be coated is extruded entirely surrounded by chocolate, and cut-off means for said pumps operable to prevent back feed through the nozzle towards the pump.

5. A confectionery making machine including in combination, two separate containers for different materials, two sets of pumps arranged in horizontally opposed pairs, one to pump material from one container and the other to pump material from the other container, a set of nozzle apparatus one for each pair of pumps made up of one pump from each set of pumps, each nozzle apparatus comprising a tube forming the outlet for one pump and a second tube surrounding the first tube with an annular passage between them forming the outlet for the other pump of the pair and means to operate said pumps in the desired timed relation, said tubes being vertical and concentric substantially from the level of the connected pump outlets to the exit ends of the tubes.

6. A confectionery making machine including in combination, two separate containers for different materials, two sets of pumps arranged in horizontally opposed pairs, one to pump material from one container and the other to pump material from the other container, a set of nozzle apparatus one for each pair of pumps made up of one pump from each set of pumps, each nozzle apparatus comprising a tube forming the outlet for one pump and a second tube surrounding the first tube with an annular passage between them forming the outlet for the other pump of the pair and means to operate said pumps for the material to be fed through the annular passages to start before and end after the material is fed through said central tubes, said tubes being vertical and concentric substantially from the level of the connected pump outlets to the exit ends of the tubes.

7. A confectionery making machine including in combination, two separate containers for different materials, two sets of pumps arranged in horizontally opposed pairs, one to pump material from one container and the other to pump material from the other container, a set of nozzle apparatus one for each pair of pumps made up of one pump from each set of pumps, each nozzle apparatus comprising a tube forming the outlet for one pump and a second tube surrounding the first tube with an annular passage between them forming the outlet for the other pump of the pair and means to operate said pumps with measured strokes, the strokes of one set of pumps being shorter than the strokes of the other set of pumps, said tubes being vertical and concentric substantially from the level of the connected pump outlets to the exit ends of the tubes.

8. A confectionery machine including in combination two material containers, two sets of reciprocating pumps one located under each containers with the inlet to each pump connected to the container above it, cut off bars, one common to the inlets to each set of pumps, two adjacent plates underlying said containers and provided with depending passages each connected to the outlets of a pair of pumps, one taken from each set of pumps, cut off bars, one common to the outlets from each set of pumps, centrally located tubes one in each depending passage and spaced from the walls thereof, having their upper ends openly connected to the outlets from the pumps of one only of the two sets of pumps and their lower ends open.

9. A confectionery machine including in combination, two material containers, two sets of reciprocating pumps one located under each container with the inlet to each pump connected to one container above it, cut off bars, one common to the inlets of a given set of pumps, two adjacent plates underlying said containers and provided with depending passages each connected to the outlets of a pair of pumps, one taken from each set of pumps, cut off bars, one common to the outlets from one set of pumps, a centrally located tube in each depending passage and spaced from the walls thereof, having its upper end openly connected to the outlet from one of the pumps of one only of the two sets of pumps and its lower end open, power operated mechanism to actuate said pumps and cut off bars in the desired timed relation, a rotatable nozzle mounted at the lower end of each depending passage and means to rotate said nozzles at the end of the pump's discharging operation.

WILLIAM CHRISTOPHER SCHOPPNER.